Oct. 16, 1962   L. E. WHITAKER   3,058,754
STAIR CLIMBING DEVICE
Filed July 2, 1959
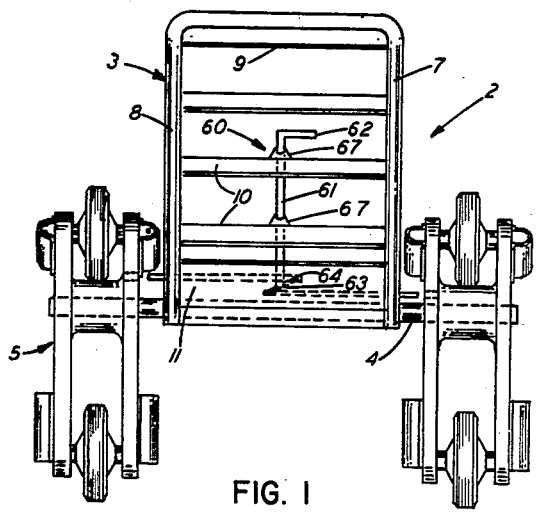
FIG. 1
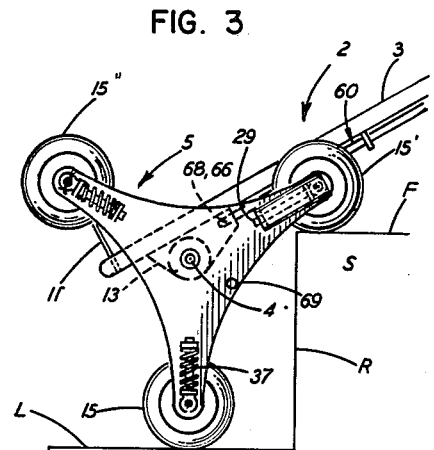
FIG. 3
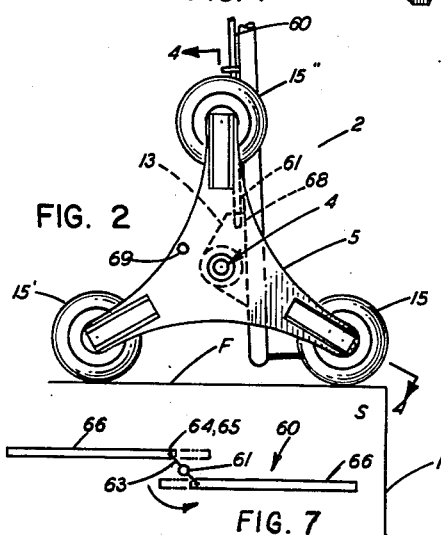
FIG. 2
FIG. 7
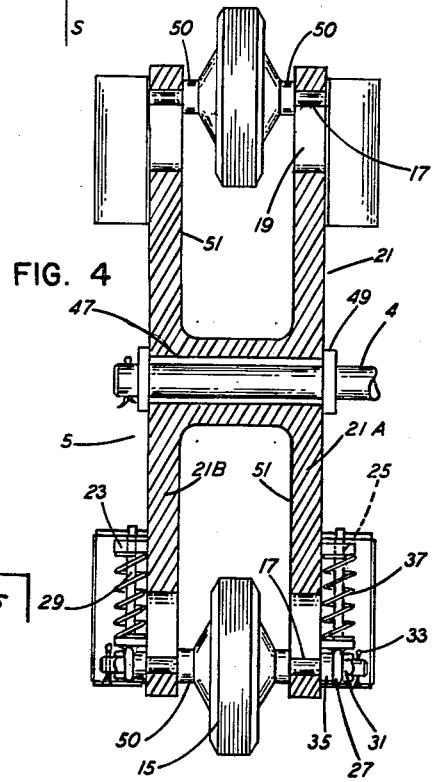
FIG. 4
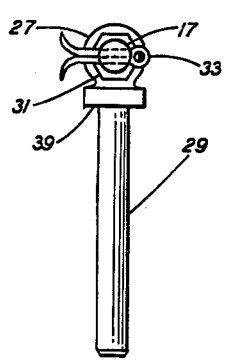
FIG. 5
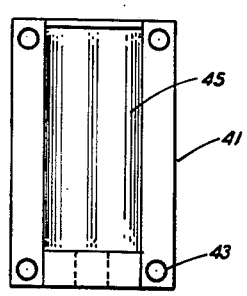
FIG. 6
INVENTOR.
LEONARD E. WHITAKER
BY
*F. D. Copeland Jr.*
AGENT

United States Patent Office 3,058,754
Patented Oct. 16, 1962

3,058,754
STAIR CLIMBING DEVICE
Leonard E. Whitaker, 10002 Scyene Road, Dallas, Tex.
Filed July 2, 1959, Ser. No. 824,679
2 Claims. (Cl. 280—5.26)

This invention relates generally to hand propelled vehicles of the nature of moving dollies and more particularly to such vehicles and dollies which may be required to ascend or descend stairs or traverse ridges and uneven ground which includes abrupt changes in elevation.

This invention is an improvement on prior art devices which were designed to facilitate movement up and down a flight of stairs.

An important object of this invention is to provide a stair climbing dolly which will be suited to repeated use with heavy loads and which will not break down under severe handling and rough operating conditions.

A further object is to provide a stair climbing device including shock mounted climbing wheels.

An additional object is to provide a stair climbing device including a plurality of individual shock mounted climbing wheels.

And yet another object is to provide a shock absorbing means for a device of this type which comprises individual springs associated with the axle of each climbing wheel.

A still further object of this invention is to provide a unique stair climbing wheel frame which will accommodate a plurality of individual wheels which are adapted to move relative to the frame under a shock imposing load.

These and other objects and advantages will be apparent from an examination of the following specification when taken in conjunction with the accompanying drawing in which:

FIG. 1 represents a top perspective view of the stair climbing dolly of this invention.

FIG. 2 is a side elevational view of the stair climbing dolly showing its approach to a stair step which it will descend.

FIG. 3 is a view similar to FIG. 2 after the stair climbing dolly has negotiated the first step in its descent.

FIG. 4 is an enlarged detail cross sectional view of the stair climbing wheel assembly (detached from the dolly) taken along the lines 4—4 of FIG. 2.

FIG. 5 is an enlarged side elevational detail view of the spring rod detached from the assembly of FIG. 4 but showing the manner of its attachment to the wheel axle.

FIG. 6 is an enlarged detail view of the spring cover employed in FIG. 4.

FIG. 7 is a diagrammatic plan view showing the locking pins which convert this normally four ground wheel dolly to a two ground wheel device.

Referring now more particularly to the characters of reference on the drawing it will be observed in FIG. 1 that the complete stair climbing dolly of this invention, indicated generally at 2, consists basically of a carrying structure 3 having a rigidly mounted transverse axle 4 near its lower end, on which axle a pair of stair climbing wheel assemblies indicated generally at 5 are mounted.

The structure portion 3 of the stair climbing dolly 2 of FIG. 1 is seen to include a U-shaped tubular member 7 having vertical side arms 8 and a top horizontal section 9 which serves as a handle by which the operator propels and manipulates the dolly 2. Member 7 is supported by a series of horizontal pieces 10, extending between the side arms 8, the lowermost of which is the load carrying platform 11. The axle 4 is supported by the structure 3 and is spaced slightly to the rear of the main part of the structure by flanges 13 (FIG. 3) and at such a location as to permit full rotation of the wheel assembly 5 relative to the structure 2.

In FIGS. 2 and 3 the operation of the dolly 2 and its stair climbing wheel assembly 5 may be observed. As the dolly approaches the ledge of stair step S of FIG. 2 two of its wheels 15 and 15' are in contact with the floor line F while the third wheel 15" is inactive. Once the forward wheel 15 has passed the top edge of the riser portion R of the stair step S it descends the step S while remaining in contact with the riser R until it reaches the next step land L as seen in FIG. 3. When wheel 15 has engaged the next step land L it receives a jolt due to the sudden stop and the inertial effect of any load being carried on platform 11. Wheel 15" in the meantime has begun its rotation about the axle 4 and further movement of the dolly 2 will cause it to engage the next land L or riser R (depending on the dimensions of the steps S) and will cause wheel 15' to lift out of engagement for the time being until it is similarly rotated back into ground engagement.

Each of the wheels 15 is supported by bearings on a stationary transverse shaft 17 which is permitted a controlled movement in the radial slot 19 of the housing 21 as seen in FIG. 4. External to and adjacent each slot 19 is a small lug 23 having a hole 25 extending therethrough in the direction of the slot 19. Each end of each shaft 17 engages and passes thru the eyelet 27 of a spring rod 29 and is threadedly engaged by nut 31 which is locked against vibrational loosening by the cotter 33 shown in FIG. 4. The eyelet 27 is separated from the housing 21 by a washer 35 having a diameter greater than the width of the shaft 17. By this arrangement, a shock absorbing compressional spring 37 may be inserted in surrounding relation to the spring rod 29 and may operate between the limits defined by the lower flange 39 of the eyelet 27 and the lower side of lug 23 while the free end of the spring rod 29 reciprocates in guided relation through the hole 25 of the lug 23.

FIG. 6 shows the detail structure of the cover 41 used in FIG. 4 to enclose each operating spring 37 to both protect the spring and prevent its entanglement with external articles when the dolly 2 is in use. Cover 41 is firmly attached to the outer face of the housing by capscrews (not shown) which extend through openings 43 and threadedly engage the housing 21. Cover 41 includes a smooth convex surface 45 which encloses the spring 37 and which surface will slide by upholstered furniture, drapes, clothing and the like to prevent entanglement or grease damage which might result from direct contact by the spring with these elements. Each end of the cover 41 is enclosed to reduce the entrance of foreign matter which might interfere with the proper operation of the spring.

The action of a sudden load applied to the bottom of wheel 15 (FIG. 4) will cause the wheel to move up due to the sliding contact of its shaft 17 with the walls of slot 19. The amount of travel of the shaft 17 will be determined by a ratio of the external load imposed on the wheel 15 and the compressional resistance of the spring 37.

The use of a sleeve bushing 47 of a bronze material known commercially as "oilite" and the use of spaced set collars 49 on axle 4 will provide a rugged stair climbing wheel assembly 5 which, together with the individual shock mounted wheels 15 will provide a more durable and efficient stair climbing dolly than has been available in conventional devices for this purpose.

The individual wheels 15 each include laterally spaced bosses 50 adjacent their shaft 17. These bosses slideably engage the inside face 51 of the housing 21 in the vicinity of the radial slots 19, and the combination of the boss 50 on one side of slot 19 and the collar 35 on the opposite side of the slot will provide a rugged and durable construction which will prevent the spaced sides 21A and 21B of the H-shaped cross section of housing 21 from becoming bowed in or out during the heavy loads imposed under operating conditions.

It will be noted in FIGS. 1–3 and 7 that a provision is shown on the dolly 2 to permit its conversion from a dolly having four ground engaging wheels to one which has only two ground engaging wheels by the use of a locking means identified generally at 60. The structure of this means includes a generally vertically extending rod 61 having a handle 62 at its upper end and being welded at its lower end to a rigid U-shaped link 63. Link 63 includes downwardly projecting pivot pins 64 which are adapted to turnably engage corresponding openings 65 at the inboard ends of a pair of generally parallel laterally extending locking pins 66. Control rod 61 is supported in spaced bearing blocks 67 which permit free rotation of the rod when torque is applied to the handle 62 but prevent axial movement of the rod which might tend to misalign the locking pins 66, which latter elements are in turn guided and aligned by means of holes 68 in axle support flanges 13. When the dolly 2 is used as a four wheel device, the locking means 60 occupies an inactive position as shown in FIG. 1 wherein the extreme lateral ends of locking pins 66 are disposed at a spaced distance from the inboard sides of the wheel assemblies 5. However when it is desired to operate this dolly as a two wheel device, the top section 9 of the structure 3 is pulled rearward and downward until the locking pins 66 are in alignment with the locking holes 69 in the housings 21 and at this point the handle 62 is rotated counterclockwise until the link 63 has forced the locking pins 66 to move sufficient lateral distance to become securely seated in the locking holes 69. The top section 9 is then raised until the structure 3 has assumed a normal working position and during this movement of section 9, the rear ground engaging wheels (15 of FIG. 2) will lift off of the ground and the device 2 then becomes a two wheel dolly. One advantage a two wheel dolly possesses over a four ground wheel dolly is the ability of the former to negotiate sharp turns when operating in close quarters; and as pointed out, one of the particular advantages of the latter named dolly is its ability to negotiate stairs while carrying heavy loads. Therefore it will be seen that the stair climbing device of this invention may selectively be operated as the embodiment best suited to the requirements as they present themselves and this selectivity may be accomplished virtually instantaneously even while carrying a heavy load.

What is claimed is:

1. In combination, a stair climbing vehicle frame structure having vertical side arms, a long transverse axle extending between and substantially beyond said side arms, a stair climbing wheel housing of H-shaped cross-section journalled at each end of said axle, each housing including at least three pairs of parallel legs and a pair of matched slots near the outer ends of said legs, a non-rotatable transverse shaft extending between said legs and passing thru and beyond said slots, a wheel rotatably engaging each shaft, an eyelet rod engaging each outermost end of each transverse shaft, means for fastening said rod and said shaft together beyond the end of said housing, and spring means between said rod and said housing for permitting said shaft to float in said matched slots when said wheel is subject to travel and impact loads, and cover means adapted to enclose all of said spring while permitting the outer end of said rod to move thru said cover means.

2. In combination, a stair climbing vehicle frame structure having vertical side arms, a long transverse axle extending between and substantially beyond said side arms, a stair climbing wheel housing of H-shaped cross-section journalled at each end of said axle, each housing including at least three pairs of parallel legs and a pair of matched slots near the outer ends of said legs, a non-rotatable transverse shaft extending between said legs and passing thru and beyond said slots, a wheel rotatably journalled to each shaft, a spring rod attached to each outermost end of each transverse shaft, means for attaching said rod and shaft together beyond the end of said housing, and spring means between said rod and housing for permitting said shaft to float in said matched slots when said wheel is subjected to travel and impact loads, and cover means adapted to enclose said spring means while permitting said rod to move freely therein.

References Cited in the file of this patent

UNITED STATES PATENTS

| 843,034 | Ridgway et al. | Feb. 5, 1907 |
| 888,426 | Legge | May 19, 1908 |
| 968,790 | Olsen | Aug. 30, 1910 |
| 1,969,048 | Smith | Aug. 7, 1934 |
| 2,447,582 | Klumb | Aug. 24, 1948 |
| 2,664,962 | Faszczuk | Jan. 5, 1954 |
| 2,736,564 | Loam et al. | Feb. 28, 1956 |
| 2,747,883 | Frost | May 29, 1956 |
| 2,915,776 | Hanson et al. | Dec. 8, 1959 |

FOREIGN PATENTS

| 650,856 | France | Oct. 1, 1928 |